(12) United States Patent
Ramos

(10) Patent No.: US 6,391,094 B2
(45) Date of Patent: May 21, 2002

(54) METHOD AND APPARATUS FOR REMOVING GAS FROM DRILLING MUD

(76) Inventor: Daniel A. Ramos, P.O. Drawer 370, Hidalgo, TX (US) 78557-0370

( * ) Notice: Subject to any disclaimer, the term of this patent is extended or adjusted under 35 U.S.C. 154(b) by 0 days.

(21) Appl. No.: 09/888,556

(22) Filed: Jun. 26, 2001

Related U.S. Application Data
(60) Provisional application No. 60/219,113, filed on Jul. 19, 2000.

(51) Int. Cl.$^7$ ................................................ B01D 19/00
(52) U.S. Cl. .............................. 95/248; 95/260; 96/177; 96/196; 96/214; 96/217
(58) Field of Search ........................ 95/248, 260, 261, 95/262; 96/177, 178, 196, 197, 198, 214, 217, 220

(56) References Cited

U.S. PATENT DOCUMENTS

| | | | |
|---|---|---|---|
| 3,157,478 A | | 11/1964 | Edwards ........................ 55/36 |
| 3,201,919 A | * | 8/1965 | Long |
| 3,226,916 A | * | 1/1966 | Bradford et al. |
| 3,271,929 A | * | 9/1966 | Bowden et al. |
| 3,402,527 A | * | 9/1968 | Moore |
| 3,769,779 A | * | 11/1973 | Liljestrand |
| 3,831,352 A | * | 8/1974 | Parcels |
| 3,898,061 A | * | 8/1975 | Brunato |
| 3,973,930 A | * | 8/1976 | Burgess |
| 4,046,528 A | * | 9/1977 | Liljestrand |
| 4,084,946 A | * | 4/1978 | Burgess |
| 4,272,258 A | | 6/1981 | Shifflett ........................ 55/52 |
| 4,344,774 A | | 8/1982 | Skipper ........................ 55/41 |
| 4,365,977 A | * | 12/1982 | Egbert |
| 5,316,563 A | | 5/1994 | Ishimura et al. ............. 65/32.5 |
| 5,462,585 A | | 10/1995 | Niskanen et al. ............. 95/261 |
| 5,698,014 A | | 12/1997 | Cadle et al. .................. 96/157 |
| RE36,082 E | | 2/1999 | Ishimura et al. ............. 65/32.5 |
| 5,902,378 A | | 5/1999 | Obrejanu ..................... 95/248 |
| 6,019,825 A | | 2/2000 | Greene et al. ................ 96/209 |
| 6,036,749 A | | 3/2000 | Ribiero et al. ................ 95/261 |

FOREIGN PATENT DOCUMENTS

GB              1557307           10/1979

* cited by examiner

Primary Examiner—Duane S. Smith
(74) Attorney, Agent, or Firm—Richard C. Litman

(57) ABSTRACT

An apparatus and method that is used for removing gas from drilling mud coming from gas and oil well-bores. The apparatus receives the gas ladened drilling mud and utilizes the energy from the gas ladened mud to power blower fans that are used to discharge any released gas. A set of conical trays are used to catch the gas ladened mud that is dispersed in the energy utilization by a set of helical blades. The gas ladened mud will slowly flow down the conical trays and liberate gas with the assistance of a partial vacuum that is within the reaction vessel. A liquid trap is also formed in the bottom portion of the reaction vessel, to prevent air from entering the reaction vessel. The gas generated is expelled out of the reaction vessel and burned off by a flare line or simply released into the outside air.

4 Claims, 4 Drawing Sheets

METHOD AND APPARATUS FOR REMOVING GAS FROM DRILLING MUD

CROSS-REFERENCE TO RELATED APPLICATION

This application claims the benefit of U.S. Provisional Patent Application Ser. No. 60/219,113, filed Jul. 19, 2000.

BACKGROUND OF THE INVENTION

1. Field of the Invention

The present invention relates to a method and apparatus for removing gas from drilling mud coming from gas and oil well-bores.

2. Description of Related Art

The removal of gas from drilling mud or fluid associated with the oil and natural gas industry is an important part of the safe operation of an oil and gas well site. This drilling mud must be treated to remove the methane-based gas that could potentially harm workers and complicate drilling. This drilling mud is typically treated to remove the dangerous gas and recycled to the well site. These "mud degassers" typically utilize centrifugal technology, laminar flow technology at atmospheric pressure or laminar flow technology at pressures less than atmospheric pressure.

U.S. Pat. No. Re 36,082 and U.S. Pat. No. 5,316,563, both issued to Ishimura et al., outlines a vacuum degassing method that is similar to the technology used to remove dangerous gas from drilling mud in the oil and gas industry. This patent outlines a method that is used to degas molten glass substances at high temperatures. Molten glass material is moved up and down a receiving line into a treatment furnace, where a vacuum is used to vent off any dangerous gases that are associated with the treatment furnace.

U.S. Pat. No. 4,272,258, issued to Shifflett, outlines the use of a method and apparatus to degas drilling mud used in the oil and gas industry. The gas ladened drilling mud is fed into a cylindrical vessel where it is forced upward by the action of an internal auger device. The internal auger device is also perforated, with the combined movement of the drilling mud in the cylinder and perforations causing the drilling mud to release much of the gases trapped within.

U.S. Pat. No. 4,344,774, issued to Skipper, also outlines the use of a method and apparatus to degas drilling mud used in the oil and gas industry. The apparatus is a hollow cylindrical housing with a rotatable auger shaft that is centered therein. The auger shaft supports an uneven screw conveyor that forces the gas laden drilling mud upward across an exhaust manifold that sucks the released gases from the drilling mud. The screw conveyor is also perforated and the degassed mud is also automatically taken away from the cylindrical housing once gas has been removed from the mud.

Several patents outline the use of liquid/gas or mud gas separators such as U.S. Pat. No. 5,698,014 issued to Cadle et al., U.S. Pat. No. 5,902,378 issued to Obrejanu, U.S. Pat. No. 6,019,825 issued to Greene et al., and U.S. Pat. No. 6,036,749 issued to Ribeiro et al. The technology involved with the liquid/gas separators includes agitation, acceleration, deceleration, centrifugation or precipitation and is a different than the technology involved with a degasser.

Although the liquid/gas separators can be useful in some chemical and industrial settings, what would be more useful is developing a more efficient degasser method and apparatus for removing gas from drilling mud used in oil and gas wells. That's what is really needed.

None of the above inventions and patents, taken either singly or in combination, is seen to describe the instant invention as claimed.

SUMMARY OF THE INVENTION

The invention is an apparatus and method that is used for removing gas from drilling mud coming from gas and oil well-bores. The apparatus receives the gas ladened drilling mud and utilizes the energy from the flow of gas ladened mud to power a blower fan that is used to discharge any released gas. A set of conical trays are used to catch the gas ladened mud that is dispersed in the energy utilization by a set of helical blades. The gas ladened mud will slowly flow down the conical trays and liberate gas with the assistance of a partial vacuum that is generated within the reaction vessel. A liquid trap is also formed in the bottom portion of the reaction vessel to prevent air from entering the reaction vessel. The gas generated is expelled out of the reaction vessel and burned off by a flare line or simply released into the outside air. The method described utilizes the apparatus in an automated process that receives gas ladened mud from oil and gas well bores and removes the gas from the mud and transfers the cleaned mud to a mud tank for reuse.

Accordingly, it is a principal object of the invention to provide an apparatus and method that does not utilize any motors for its operation and does not require any additional energy.

It is another object of the invention to provide a degassing process that eliminates hazardous working condition exposures.

It is a further object of the invention to provide a degassing process that remains confined through the full process until the gas is finally and safely released through a flare line.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
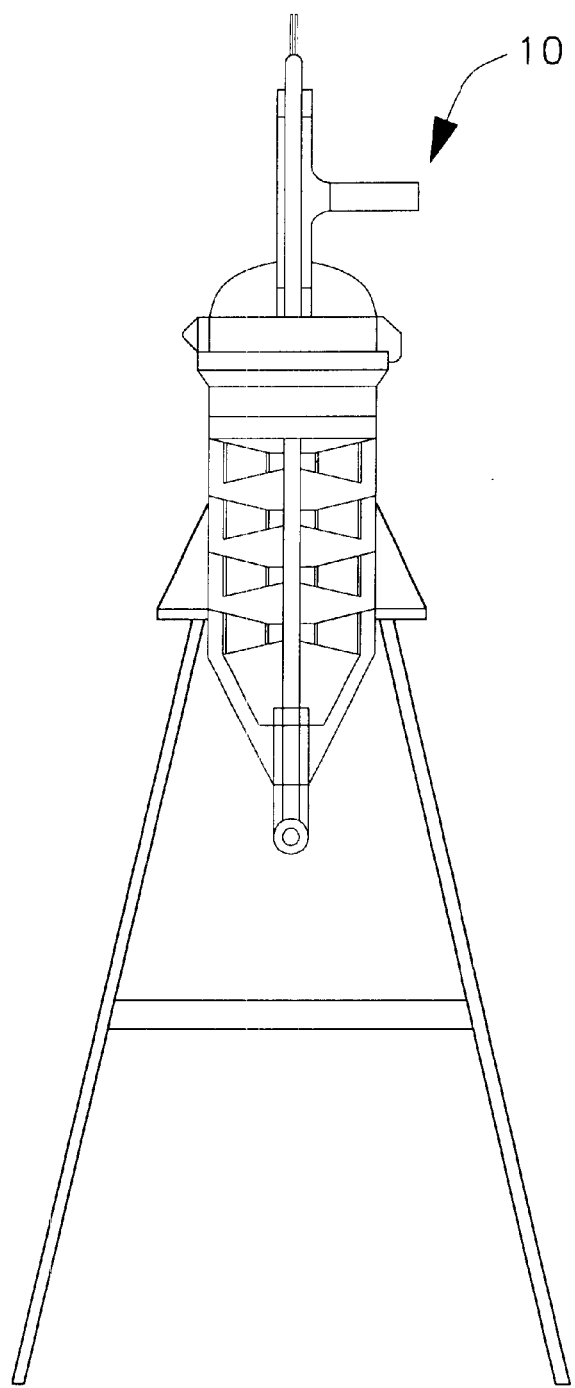
FIG. 1 is an environmental, perspective view of an apparatus for removing gas from drilling mud according to the present invention.

The present invention is an apparatus 10 used for removing gas G from the drilling mud M of natural gas and oil well-bores, as depicted in FIG. 1. The invention also involves a method 220 (FIG. 4) that is used to remove gas G from the drilling mud M of natural gas and oil well-bores, which is outlined in more detail below.

Figure 2:
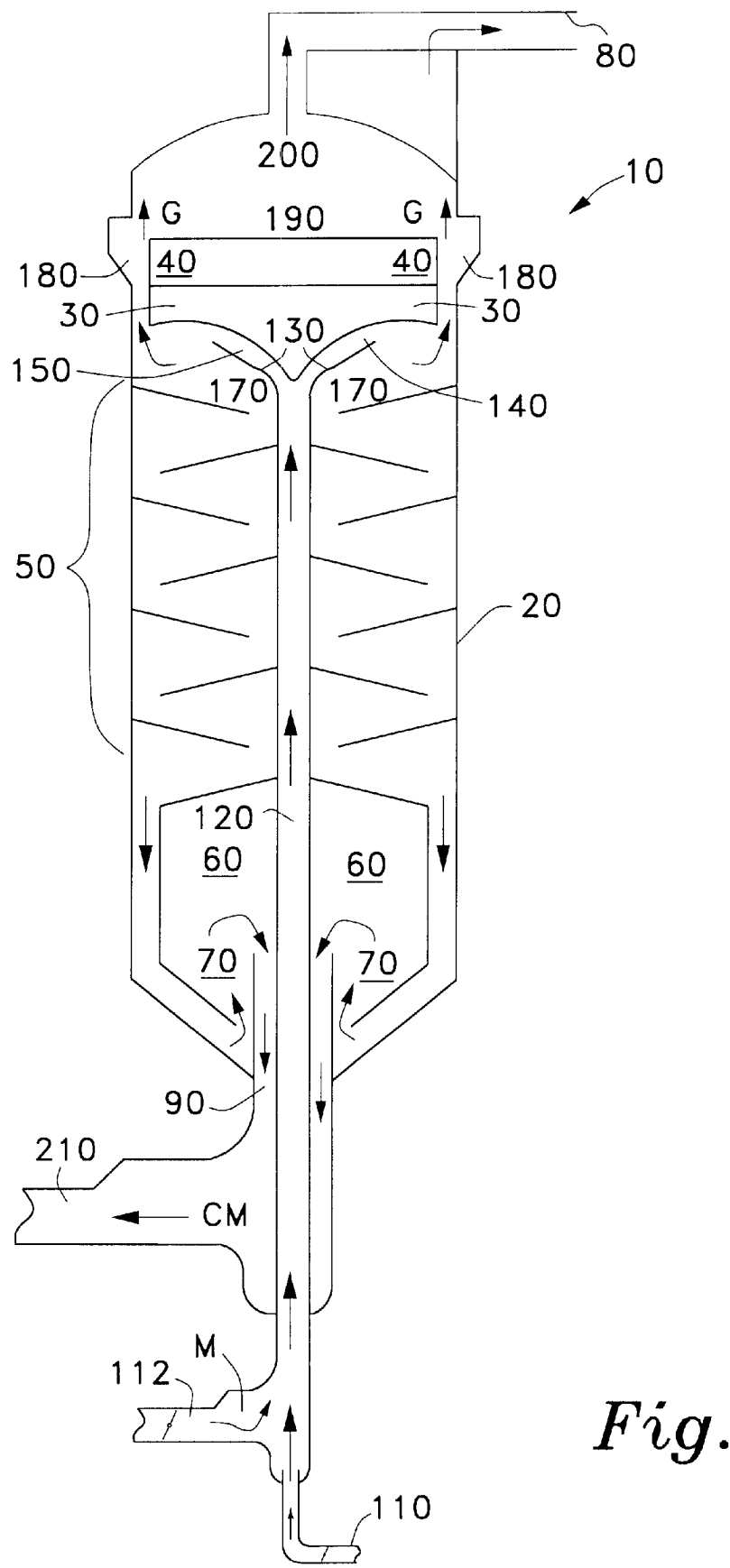
FIG. 2 is a cross sectional view of an apparatus used to remove gas from drilling mud according to the present invention.

As depicted in FIG. 2, the apparatus 10 is comprised of a steel cylinder reaction vessel 20 that receives the gas ladened drilling mud M that travels upward within the reaction vessel 20, a set of helical contact blades 30 that are impinged by the gas ladened drilling mud M within the processing vessel 20, the helical contact blades 30 also discharging the gas ladened drilling mud M from below, and a set of blower type blades 40 that are generated by the energy from the impinged helical contact blades 30 that expel any gas G released from the gas ladened drilling mud M.

The apparatus 10 is further comprised of a set of conical trays 50, that are alternatively concave and convex, that catch the dispersed drilling mud M and allow the drilling mud M to flow down the conical trays 50 and allows gas G (minute gas bubbles) to disperse within the reaction vessel 20, a truncated cone 60 that forms a liquid trap 70 that prevents ambient air at atmospheric pressure from entering the bottom portion of the reaction vessel 20, a flare line 80 on top of the reaction vessel 20 to burn off any gas G expelled or dispersed from the drilling mud M and an annular pathway 90 for the clean drilling mud CM that falls from the conical trays 50 and through the liquid trap 70 and to the bottom of the reaction vessel 20.

Figure 4:
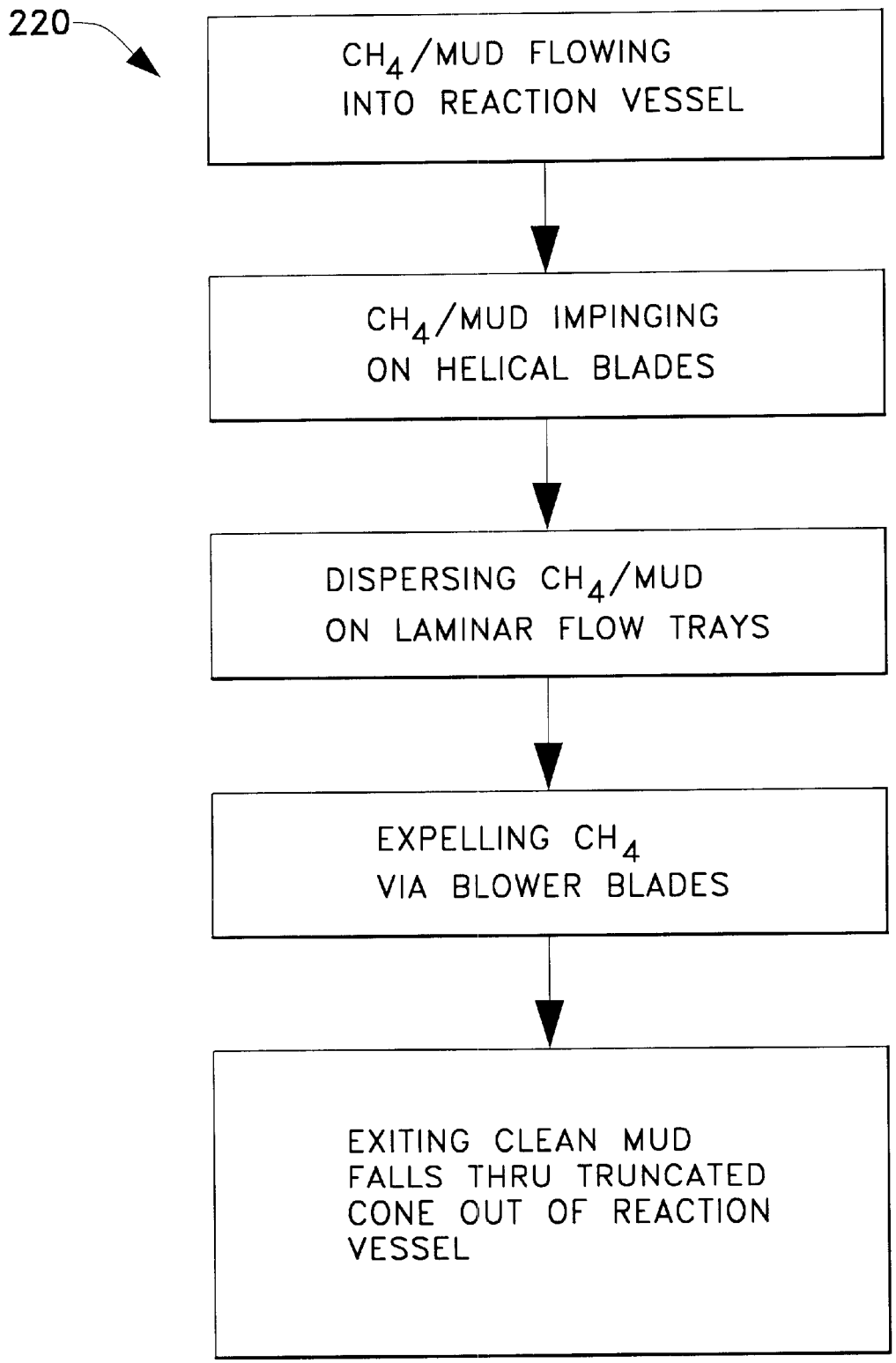
FIG. 4 is a block diagram of an overall method for removing gas from drilling mud according to the present invention.

Gas ladened mud M is transported to the bottom of the apparatus 10 from a well-bore 100 via a 3" wide line 110 and a 6" wide line 112 from the mud tanks. The well-bore 100 provides enough energy in the movement of the gas ladened mud M to power the entire apparatus 10 and degassing method 220 (FIG. 4). The gas G is physically within (in the form of small gas bubbles) the gas ladened mud M, which must be removed to ensure safety and more efficient drilling during its next recycled use.

Once the gas ladened mud M enters the apparatus 10, it is transported straight up through a pathway 120 in the center of the reaction vessel 20. As the gas ladened mud M flows up the pathway 120, it is separated radially, in all directions by a funnel-shaped flange 130 situated in the pathway 120. The divided stream of gas ladened mud M then makes impinging contact with multiple helical contact blades 30 (which are tilted inward) to receive both streams of the gas ladened mud M.

Multiple pathways 140 and 150 are provided between the flange 130 and the helical contact blades 30 to ensure proper contact of the fluid flow with the helical contact blades 30. This is crucial to the operation of the apparatus 10, since energy carried into the vessel 20, from the gas ladened mud M is transferred to the helical contact blades 30. In turn, the energy from the helical contact blades 30 is used to power the blower type blades 40 that eventually discharge the gas G that is liberated from the overall degassing process taking place throughout the reaction vessel 20.

In addition, the rotating speed and orientation of the blower type blades 40 creates a partial vacuum 170 inside the reaction vessel 20. The blower type blades 40 also gather gas from the inside perimeter of the upper cylinder 180 and move it towards the center of the upper cylinder 190, generating sufficient pressure to expel the gas through the flare line 80. A supplemental pump (not shown) can also be attached to the reaction vessel 20. This type of technology is well-known to those schooled in the related art and is not a novel feature of this invention.

After the gas ladened mud M impinges the helical contact blades 30, it is then dispersed beneath the helical contact blades 30 onto a series of alternating concave and convex conical trays 50 that are provided in the middle section of the reaction vessel 20. These conical trays 50 are slanted downward and act as a laminar flow vehicle that create a very thin layer of gas ladened mud M over the surface of the conical trays 50.

As the gas ladened mud M slowly flows downward in very thin layers, it allows minute gas bubbles to migrate and be suctioned out of the reaction vessel 20 by the partial vacuum 170 created by the blower type blades 40 and is sent via tubular outlet 200 to a flare line 80 to be burned off or is released directly into the air. As the gas G is removed from the gas ladened mud M, the now clean mud CM exits the bottom of the reaction vessel 20 through the truncated cone 60 and annular pathway 90, while maintaining the integrity of the liquid trap 70. The clean mud CM is then transferred from the bottom of the apparatus 10, typically via pipeline 210, to a mud tank (not shown) that will reuse the clean mud CM again.

Figure 3:
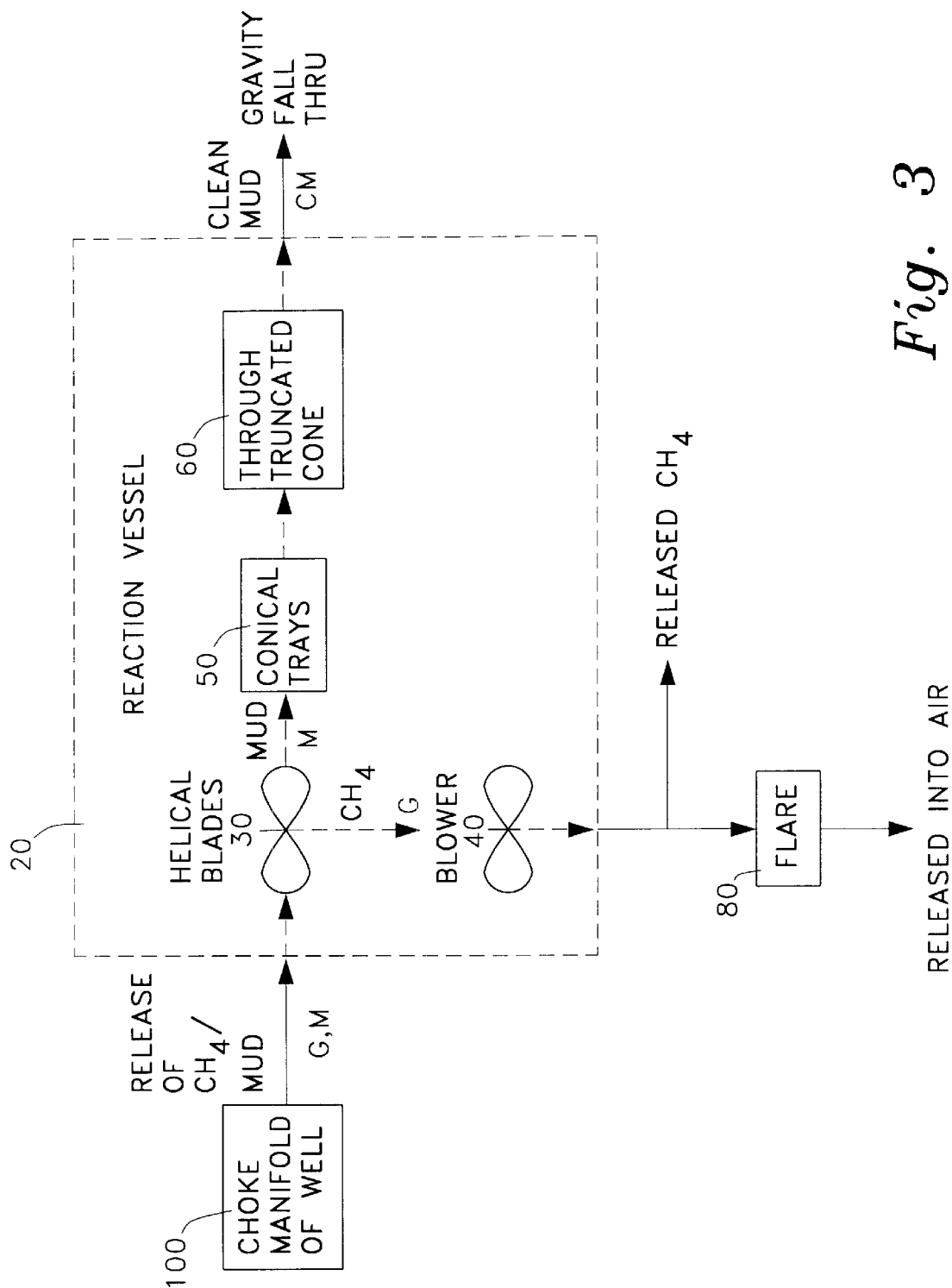
FIG. 3 is a process flow diagram of a method for removing gas from drilling mud according to the present invention.

Use of the apparatus 10 in a process flow diagram is expressed in FIG. 3, which have already been described in detail in the discussion of FIG. 2.

The removal of the gas G from the gas ladened mud M can also be thought of in terms of a process or method. Specific steps of this method are outlined in FIG. 4. A method 220 of removing gas G from the gas ladened drilling mud M from natural gas and oil well-bores 100, comprises the steps of flowing the gas ladened drilling mud M into a reaction vessel 20, impinging the flowing gas ladened drilling mud M on a set of helical blades 30 and dispersing the gas ladened drilling mud M on a set of laminar flow trays 50 allowing more gas G to be released from the gas ladened drilling mud M.

The method 220 further comprises the steps of expelling the gas G generated within the reaction vessel 20, utilizing a set of blower blades 40 that are powered by the helical blades 30 impinged by the flowing gas ladened drilling mud M and exiting the degassed clean drilling mud CM from the bottom of the reaction vessel 20. The steps of the method 220 also correspond and follow the process flowchart in FIG. 3 and the discussion of the apparatus 10 in FIG. 2.

Operation of the apparatus 10 and method 220 is typically automated, where a line of gas ladened mud M is transported to the apparatus 10, which operates by itself and transfers the clean mud CM via another line to a mud tank (not shown) to be stored until it is used again.

It is to be understood that the present invention is not limited to the embodiments described above, but encompasses any and all embodiments within the scope of the following claims.

I claim:

1. An apparatus used for removing gas from drilling mud from natural gas and oil well-bores, comprising:

a hollow cylindrical reaction vessel defining a chamber, the vessel having a dome-shaped top end and a conical bottom end;

a flare tube extending from the top end of said vessel for exhausting gas from said vessel;

at least one inlet tube extending through the bottom end of said vessel, the inlet tube extending upward in said vessel and terminating in an open discharge end having a funnel-shaped flange;

a set of rotatable helical contact blades disposed immediately above the discharge end of said inlet tube;

a set of blower blades mounted above said helical blades, the blower blades rotating when said helical blades rotate in order to create a vacuum to exhaust gas from said vessel through said flare tube;

a set of conical trays attached to said vessel and said inlet tube;

a truncated cone disposed at the bottom end of said chamber about said inlet tube, and defining a liquid trap and partial vacuum for preventing air from entering the bottom end of said vessel; and a discharge tube concentric with and disposed around said inlet tube to define an annular pathway, the discharge tube extending into and spaced apart from said truncated cone;

wherein drilling mud having gas entrained therein enters the inlet tube and is discharged radially against said helical blades, causing said helical blades and said blower blades to rotate and form a vacuum for exhausting gases through said flare tube, the drilling mud falling successively in a laminar flow on said conical trays to release the entrained gas, the cleaned drilling mud flowing into the truncated cone and through the annular pathway, being discharged from said vessel through said discharge tube.

2. The apparatus according to claim 1, wherein said cylindrical reaction vessel is made of steel.

3. The apparatus according to claim 1, wherein said set of conical trays are alternatively concave and convex.

4. A method of removing gas entrained in a gas ladened drilling mud from natural gas and oil well-bores, comprising the steps of:

flowing the gas ladened drilling mud into a reaction vessel;

impinging the flowing gas ladened drilling mud on a set of helical blades disposed in the reaction vessel in order to rotate said helical blades, the helical blades having blower blades mounted thereabove for creating a vacuum;

dispersing the gas ladened drilling mud on a set of laminar flow trays disposed in the reaction vessel below said helical blades, thereby allowing more gas to be released from the gas ladened drilling mud;

expelling the gas generated within the reaction vessel utilizing the set of blower blades to exhaust the gas through a flare tube exiting a top end of the reaction vessel; and exiting the degassed drilling mud from a bottom end of the reaction vessel.

* * * * *